(12) United States Patent
Fitz et al.

(10) Patent No.: US 9,605,162 B2
(45) Date of Patent: *Mar. 28, 2017

(54) CORROSION INHIBITING COMPOSITIONS AND METHODS OF MAKING AND USING

(71) Applicant: Honda Motor Co., Ltd., Tokyo (JP)

(72) Inventors: Todd Andrew Fitz, Marysville, OH (US); Mariko Elaine Berg, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 77 days.

This patent is subject to a terminal disclaimer.

(21) Appl. No.: 13/839,895

(22) Filed: Mar. 15, 2013

(65) Prior Publication Data

US 2014/0272392 A1   Sep. 18, 2014

(51) Int. Cl.
*C09D 5/08* (2006.01)
*C09D 7/12* (2006.01)
*C08K 9/10* (2006.01)

(52) U.S. Cl.
CPC .......... *C09D 7/1233* (2013.01); *C09D 5/086* (2013.01); *C08K 9/10* (2013.01); *Y10T 428/263* (2015.01); *Y10T 428/265* (2015.01); *Y10T 428/31678* (2015.04)

(58) Field of Classification Search
CPC ........ C09D 5/08; C09D 5/086; C09D 7/1233; Y10T 428/263; Y10T 428/265; Y10T 428/31678; B62D 29/008; C22C 21/10; C22F 1/053; C08K 9/10
See application file for complete search history.

(56) References Cited

U.S. PATENT DOCUMENTS

| | | |
|---|---|---|
| 3,293,977 A | 12/1966 | Dalton et al. |
| 3,478,409 A | 11/1969 | Votaw et al. |
| 3,505,244 A | 4/1970 | Cessna et al. |
| 3,779,715 A | 12/1973 | Wendler et al. |
| 4,404,828 A | 9/1983 | Blachford |
| 4,714,564 A | 12/1987 | Lynch et al. |
| 4,849,282 A | 7/1989 | Watanabe et al. |
| 5,082,536 A | 1/1992 | Izaki et al. |
| 5,097,039 A | 3/1992 | Braig et al. |

(Continued)

FOREIGN PATENT DOCUMENTS

| | | |
|---|---|---|
| CA | 814909 A | 6/1969 |
| CN | 1286720 A | 3/2001 |

(Continued)

OTHER PUBLICATIONS

U.S. Appl. No. 13/841,393; Titled: Corrosion Inhibiting Compositions and Coatings Including the Same, filed Mar. 15, 2013; Inventors: Todd Andrew Fitz et al., in its entirety.

(Continued)

*Primary Examiner* — Michael B Nelson
(74) *Attorney, Agent, or Firm* — Arent Fox LLP (57) ABSTRACT

A corrosion inhibiting composition includes one or more of a plurality of carriers, each having a carrier body and an organic corrosion inhibitor, such that the carrier body encapsulates the organic corrosion inhibitor, and the carrier body is formed of a degradable material. Coatings and methods for inhibiting corrosion on a metal substrate are also described herein.

53 Claims, 3 Drawing Sheets

(56) References Cited

U.S. PATENT DOCUMENTS

| | | | |
|---|---|---|---|
| 5,686,185 A | 11/1997 | Correll et al. | |
| 5,856,378 A | 1/1999 | Ring et al. | |
| 5,948,147 A | 9/1999 | Sinko | |
| 5,989,334 A | 11/1999 | Dry | |
| 6,075,072 A * | 6/2000 | Guilbert | C09D 5/08 427/213 |
| 6,261,360 B1 | 7/2001 | Dry | |
| 6,527,849 B2 | 3/2003 | Dry | |
| 6,537,678 B1 | 3/2003 | Putnam et al. | |
| 6,933,046 B1 | 8/2005 | Cook | |
| 7,022,179 B1 | 4/2006 | Dry | |
| 7,108,914 B2 | 9/2006 | Skipor et al. | |
| 7,220,342 B2 | 5/2007 | Sauvant-Moynot et al. | |
| 7,341,677 B2 | 3/2008 | Yu et al. | |
| 7,342,057 B2 | 3/2008 | Kumar et al. | |
| 7,569,625 B2 | 8/2009 | Keller et al. | |
| 7,612,152 B2 | 11/2009 | Braun et al. | |
| 7,662,304 B2 | 2/2010 | Woyciesjes et al. | |
| 7,723,405 B2 | 5/2010 | Braun et al. | |
| 7,790,225 B1 | 9/2010 | Calle et al. | |
| 7,811,666 B2 | 10/2010 | Dry | |
| 8,088,015 B2 | 1/2012 | Kwon et al. | |
| 8,101,036 B2 | 1/2012 | Schroeder et al. | |
| 8,383,697 B2 | 2/2013 | Wilson et al. | |
| 8,552,092 B2 | 10/2013 | Xing et al. | |
| 2002/0081431 A1 | 6/2002 | Schmdt | |
| 2004/0079647 A1 | 4/2004 | Warburton et al. | |
| 2005/0176851 A1 | 8/2005 | Cook | |
| 2005/0250878 A1 | 11/2005 | Moore et al. | |
| 2006/0042504 A1 | 3/2006 | Kumar et al. | |
| 2008/0152815 A1 | 6/2008 | Stephenson et al. | |
| 2008/0299391 A1 | 12/2008 | White et al. | |
| 2009/0035551 A1 | 2/2009 | Luchsinger et al. | |
| 2009/0078153 A1 | 3/2009 | Shchukin et al. | |
| 2009/0117369 A1 | 5/2009 | Jaworowski et al. | |
| 2009/0191402 A1 | 7/2009 | Beiermann et al. | |
| 2010/0151253 A1 | 6/2010 | Roth et al. | |
| 2010/0206745 A1 | 8/2010 | Andreeva et al. | |
| 2010/0266836 A1 | 10/2010 | Campazzi et al. | |
| 2010/0305234 A1 | 12/2010 | Calle et al. | |
| 2010/0308276 A1 | 12/2010 | Dry | |
| 2010/0320421 A1 | 12/2010 | Calle et al. | |
| 2011/0064941 A1 | 3/2011 | Sachdev et al. | |
| 2011/0118385 A1 | 5/2011 | Guadagno et al. | |
| 2011/0135945 A1 | 6/2011 | Monredon-Senani et al. | |
| 2011/0171372 A1 | 7/2011 | Shearer et al. | |
| 2011/0212326 A1 | 9/2011 | Ettrich et al. | |
| 2011/0236596 A1 | 9/2011 | Skorb et al. | |
| 2011/0318562 A1 | 12/2011 | Dry | |
| 2012/0000810 A1 | 1/2012 | Dry | |
| 2012/0003463 A1 | 1/2012 | Dry | |
| 2012/0024703 A1 | 2/2012 | Poole | |
| 2012/0052307 A1 | 3/2012 | Plieth et al. | |
| 2012/0085261 A1* | 4/2012 | Barbe | C09D 5/082 106/14.42 |
| 2012/0091396 A1 | 4/2012 | Setlur et al. | |
| 2012/0207921 A1 | 8/2012 | Calle et al. | |
| 2013/0017612 A1* | 1/2013 | Li et al. | 436/75 |
| 2013/0137626 A1 | 5/2013 | Last et al. | |
| 2013/0145957 A1 | 6/2013 | Shchukin et al. | |
| 2013/0210969 A1 | 8/2013 | Grigoriev et al. | |

FOREIGN PATENT DOCUMENTS

| | | |
|---|---|---|
| CN | 1170893 C | 10/2004 |
| EP | 0619073 A2 | 10/1994 |
| EP | 0662527 A1 | 7/1995 |
| EP | 0785243 A2 | 7/1997 |
| GB | 1096749 | 12/1967 |
| GB | 1315260 | 5/1973 |
| GB | 1319729 | 6/1973 |
| GB | 1354692 | 5/1974 |
| GB | 2147678 A | 5/1985 |
| JP | 58-42834 A | 3/1983 |
| JP | 61-272391 A | 12/1986 |
| JP | 62-79277 A | 4/1987 |
| JP | 6-321595 A | 11/1994 |
| JP | 7-40491 A | 2/1995 |
| JP | 9-282644 A | 10/1997 |
| KR | 10-2013-0051125 A | 5/2013 |
| KR | 10-2013-0051126 A | 5/2013 |
| KR | 10-2013-0051127 A | 5/2013 |
| WO | WO 9946338 A1 | 9/1999 |
| WO | 2006115492 A1 | 11/2006 |
| WO | WO 2010/146001 | * 12/2010 |
| WO | 2012034974 A1 | 3/2012 |
| WO | 2012034976 A1 | 3/2012 |
| WO | WO 2013009873 A2 | 1/2013 |
| WO | 2013083292 A1 | 6/2013 |
| WO | 2013083293 A1 | 6/2013 |
| WO | 2013083294 A2 | 6/2013 |
| WO | 2013083294 A3 | 8/2013 |
| WO | 2013117611 A1 | 8/2013 |

OTHER PUBLICATIONS

U.S. Appl. No. 61/506,295; Titled: pH-Sensitive Microparticles and Their Formation, filed Jul. 11, 2011; Inventors: Wenyan Li et al., in its entirety.

Blaiszik, B.J., et al.; Self-Healing Polymers and Composites; Annual Review of Materials Research, 2010; pp. 179-211, vol. 40; University of Illinois—Urbana Champaign.

Sorensen, P.A., et al.; Anticorrosive coatings: a review; JCT Research; Jun. 1, 2009; 32 pages in its entirety; vol. 6, No. 2; American Coatings Association, Inc.

Mohseni, M. et al.; The Role of Nanotechnology in Automotive Industries; Chapter 1 in New Advances in Vehicular Technology and Automotive Engineering; Aug. 1, 2012; pp. 3-54; InTech.

Saji, V.S.; Contemporary Developments in Corrosion Inhibitors—Review of Patents; Recent Patents on Corrosion Science 2011; pp. 63-71; vol. 1, No. 1; Bentham Science Publishers.

Sonawane, S.H., et al.; Improved active anticorrosion coatings using layer-by-layer assembled ZnO nanocontainers with benzotriazole; Chemical Engineering Journal 189-190, 2012; pp. 464-472; Elsevier B.V.

Zheludkevich, M.L., et al.; Oxide nanoparticle reservoirs for storage and prolonged release of the corrosion inhibitors; Electrochemistry Communications, 2005; pp. 836-840, vol. 7; Elsevier B.V.

Suzuki, T. et al.; The Synergistic Inhibition Effect of Octylmercaptopropionate and 8-quinolinol on the Corrosion of Iron in an Aerated 0.5 M Na2SO4 Solution; Corrosion Science, 1996; pp. 1223-1234, vol. 38, No. 8; Elsevier Science Ltd.

Aramaki, K.; Effects of Organic Inhibitors on Corrosion of Zinc in an Aerated 0.4 M NaCl Solution; Corrosion Science 43, 2001; pp. 1985-2000; Elsevier Science Ltd.

Li, W. et al.; pH and Electrochemical Responsive Materials for Corrosion Smart Coating Applications; Conference Paper presented at CORROSION 2008 Conference and Expo, New Orleans, Louisiana; Mar. 16, 2008; 20 pages.

Buhrow, J. et al.; Microencapsulation Technology for Corrosion Mitigation by Smart Coatings; Technical Report presented at DoD Corrosion Conference 2011, La Quinta, California; Jul. 31, 2011; 23 pages.

Li, W. et al.; NASA KSC Smart Coating for Corrosion Applications; Oral/Visual Presentation, NASA Kennedy Space Center; Sep. 1, 2011; 39 pages.

Li, W. et al.; Microencapsulation of Corrosion Indicators for Smart Coatings; Conference Paper presented at DoD Corrosion Conference 2011, La Quinta, California; Jul. 31, 2011; 30 pages.

Thomas, Shane; International Search Report and Written Opinion of the International Searching Authority, issued in International Application No. PCT/US14/20668; dated as mailed on Aug. 8, 2014; 19 pages.

Thomas, Shane; International Search Report and Written Opinion of the International Searching Authority, issued in International Application No. PCT/US14/20674; dated as mailed on Jun. 17, 2014; 21 pages.

(56) References Cited

OTHER PUBLICATIONS

Thomas, Shane; Invitation to Pay Additional Fees and, Where Applicable, Protest Fee; issued in related International Application No. PCT/US14/20668; dated as mailed on May 19, 2014; 2 pages in its entirety.
Kress, G., et al.; Abstract of article entitled "Onsert strength design"; International Journal of Adhesion and Adhesives; Jun. 2004; pp. 201-209; vol. 24, Issue 3.
Martinez-Lucci, J., et al.; Article entitled "Self-Healing in Metal Casings"; AFS Proceedings 2011; 9 pages; American Foundry Society, Schaumburg, IL.
Shchukin, D. G., et al.; Article entitled "Self-Repairing Coatings Containing Active Nanoresevoirs"; small 2007; pp. 926-943; vol. 3, No. 6; 2007 Wiley-VCH Verlag GmbH & Co. KGaA, Weinheim.
Wheat, H. G.; Article entitled "Smart Coatings for Corrosion Detection—A Review of Recent Advances"; Proceedings of the Twenty-second (2012) International Offshore and Polar Engineering Conference; Jun. 17-22, 2012; pp. 360-363; Rhodes, Greece.
Borisova, D., et al.; Abstract of article entitled "Nanocontainer-Based Anticorrosive Coatings: Effect of the Container Size on the Self-Healing Performance"; Advanced Functional Materials; Aug. 12, 2013; pp. 3799-3812; vol. 23, Issue 30; Wiley-VCH Verlag GmbH & Co. KGaA, Weinheim.
Szabo, T., et al.; Abstract of article entitled "Self-healing microcapsules and slow release microspheres in paints"; Progress in Organic Coatings; Sep.-Oct. 2011; pp. 52-57; vol. 72, Issue 1-2; Elsevier B.V.
Mekeridis, E. D., et al.; Abstract of article entitled "Release studies of corrosion inhibitors from cerium titanium oxide nanocontainers"; Journal of Nanoparticle Research; Feb. 2011; pp. 541-554; vol. 13, Issue 2; Springer Netherlands.
Tedim, J., et al.; Abstract of article entitled "Enhancement of Active Corrosion Protection via Combination of Inhibitor-Loaded Nanocontainers"; ACS Appl. Mater. Interfaces; May 10, 2010; pp. 1528-1535; vol. 2, Issue 5; American Chemical Society.
Poznyak, S. K., et al.; Abstract of article entitled "Novel Inorganic Host Layered Double Hydroxides Intercalated with Guest Organic Inhibitors for Anticorrosion Applications"; ACS Appl. Mater. Interfaces; Oct. 12, 2009; vol. 1, Issue 10; American Chemical Society.
Yasakau, K. A., et al; Abstract of article entitled "Influence of inhibitor addition on the corrosion protection performance of sol-gel coatings on AA2024"; Progress in Organic Coatings; Workshop on Application of Electrochemical Techniques to Organic Coatings; Oct. 2008; pp. 352-361; vol. 63, Issue 3; Elsevier B.V.
Yasakau, K. A., et al; Abstract of article entitled "Inhibitor-doped hybrid sol-gel films as pre-treatments for aluminium alloys"; 17th International Corrosion Congress 2008: Corrosion Control in the Service of Society; Oct. 6-10, 2008; pp. 798-807; vol. 2, 2008; Las Vegas, NV.
Roussi, E., et al.; Abstract of article entitled "Novel hybrid organo-silicate corrosion resistant coatings based on hyperbranched polymers"; Surface and Coatings Technology; Feb. 15, 2011; pp. 3235-3244; vol. 205, Issue 10; Elsevier B.V.
Kartsonakis, I. A., et al.; Abstract of article entitled "Synthesis and Characterization of Cerium Molybdate Nanocontainers and Their Inhibitor Complexes"; Journal of the American Ceramic Society; Jan. 2010 (first published online Oct. 29, 2009); pp. 65-73; vol. 93, Issue 1; The American Ceramic Society.

Snihirova, D., et al.; Abstract of article entitled "Electrochemical study of the corrosion inhibition ability of "smart" coatings applied on AA2024""; Journal of Solid State Electrochemistry; Aug. 1, 2013; pp. 2183-2192; vol. 17, Issue 8; Springer Berlin Heidelberg.
Snihirova, D., et al.; Abstract of article entitled "Hydroxyapatite Microparticles as Feedback-Active Reservoirs of Corrosion Inhibitors"; ACS Applied Materials & Interfaces; Nov. 2010 (first published online Oct. 13, 2010); pp. 3011-3022; vol. 2, Issue 11; American Chemical Society.
Montemor, M. F., et al.; Abstract of article entitled "Evaluation of self-healing ability in protective coatings modified with combinations of layered double hydroxides and cerium molibdate nanocontainers filled with corrosion inhibitors"; Electrochimica Acta; Jan. 15, 2012; pp. 31-40; vol. 60; Elsevier Ltd.
Roussi, E., et al.; Abstract of article entitled "Novel hybrid organo-silicate corrosion resistant coatings based on dendritic polymers"; 11th International Conference and Exhibition of the European Ceramic Society 2009; Jun. 21-25, 2009; pp. 620-624; vol. 2; Polish Ceramic Society; Krakow, Poland.
Mekeridis, E. D., et al.; Abstract of article entitled "Electrodeposited sol-gel coatings containing Ce—Ti nanocontainers loaded with inhibitors for the corrosion protection of AA2024-t3"; European Corrosion Congress 2010; Sep. 13-17, 2010; pp. 1747-1753; vol. 2; Gubkin Russian State University of Oil and Gas; Moscow, Russia.
Shchukin, D.; Abstract of article entitled "Self-healing coatings with tailored functionalities"; Proc. European Coatings Conf.—Anticorrosive Coatings III; 2011; 9 pages; Berlin, Germany.
Zheludkevich M., et al.; Abstract of article entitled "Active anticorrosive coatings with multi-inhibitor nano-containers"; Proc. European Coatings Conf.—Anticorrosive Coatings II; 2009; pp. 1-13; Berlin, Germany.
Zheludkevich M., et al.; Abstract of article entitled "Active anticorrosion coatings with multi-inhibitor nanocontainers"; Anti Corrosive Coatings II, European Coatings Conference; Oct. 27-28, 2009; pp. 1-13; Berlin, Germany.
Hack, T., et al.; Abstract of article entitled Multi-level protection of materials for vehicles by "smart" nanocontainers-MUST-; Serial Title: 7. Thueringer Grenz and Oberflaechentage, 1. Zukunftsarena Oberflaechentechnik, 8. Theuringer Biomaterial-Kolloquium; Sep. 13-15, 2011; pp. 192-202; Published by Jena: INNOVENT; Zeulenroda, Germany.
U.S. Office Action, Non-Final Rejection mailed Dec. 2, 2015 for U.S. Appl. No. 13/841,393.15 pages.
U.S. Office Action, Requirement for Election/Restriction mailed Feb. 6, 2015 for U.S. Appl. No. 13/841,393. 14 pages.
U.S. Office Action, Requirement for Election/Restriction mailed Oct. 14, 2014 for U.S. Appl. No. 13/841,393. 9 pages.
U.S. Office Action, Final Rejection mailed Jun. 16, 2016 for U.S. Appl. No. 13/841,393. 15 pages.
European Search Report dated Jul. 25, 2016 for European Patent Application No. 14768701.6. 8 Pages.
Chinese Office Action, First Notification dated Sep. 1, 2016 for Chinese Patent Application No. 201480015611.1, English Translation. 14 Total Pages.
China Office Action, First Notification dated Aug. 25, 2016 for China Patent Application No. 201480015109.0. 44 Pages.
Extended European Search Report of related European Patent Application No. 14770650.1 dated Dec. 9, 2016.

\* cited by examiner

CORROSION INHIBITING COMPOSITIONS AND METHODS OF MAKING AND USING

TECHNICAL FIELD

The present disclosure generally relates to corrosion inhibiting compositions and methods of making and using such compositions, in particular compositions including organic corrosion inhibitors.

BACKGROUND

Many metals and metal alloys are subject to corrosion that causes these metals and metal alloys to lose their structural integrity. As such, methods have been developed to detect the presence of corrosion and to attempt to prevent or inhibit it.

SUMMARY

In one embodiment, a corrosion inhibiting composition includes a plurality of carriers. Each of the plurality of carriers comprises a carrier body and a corrosion inhibitor. The carrier body encapsulates the corrosion inhibitor. The corrosion inhibitor comprises an organic compound including a ring structure. The carrier body is formed of a degradable material.

In one embodiment, a corrosion inhibiting composition includes a first plurality of carriers and a second plurality of carriers. Each of the first plurality of carriers includes a first carrier body and a first corrosion inhibitor. The first carrier body encapsulates the first corrosion inhibitor. The first corrosion inhibitor comprises an organic phosphonate. The first carrier body is formed of a first degradable material. Each of the second plurality of carriers includes a second carrier body and second corrosion inhibitor. The second carrier body encapsulates the second corrosion inhibitor. The second corrosion inhibitor comprises an organic compound including a ring structure. The second carrier body is formed of a second degradable material.

In another embodiment, a corrosion inhibiting composition includes a first plurality of carriers and a second plurality of carriers. Each of the first plurality of carriers includes a first carrier body and a first corrosion inhibitor. The first carrier body encapsulates the first corrosion inhibitor. The first corrosion inhibitor comprises a first organic compound including a ring structure. The first carrier body is formed of a first degradable material. Each of the second plurality of carriers includes a second carrier body and a second corrosion inhibitor. The second carrier body encapsulates the second corrosion inhibitor. The second corrosion inhibitor comprises a second organic compound including a ring structure. The second corrosion inhibitor is different from the first corrosion inhibitor. The second carrier body is formed of a second degradable material.

In yet another embodiment, a coating for inhibiting corrosion on a metal surface includes a coating base and a corrosion inhibiting composition. The coating base includes an organic layer. The corrosion inhibiting composition is dispersed in the coating base. The corrosion inhibiting composition includes a first plurality of carriers and a second plurality of carriers. Each of the first plurality of carriers includes a first carrier body and a first corrosion inhibitor. The first carrier body encapsulates the first corrosion inhibitor. The first corrosion inhibitor comprises an organic phosphonate. The first carrier body is formed of a first degradable material. Each of the second plurality of carriers includes a second carrier body and a second corrosion inhibitor. The second carrier body encapsulates the second corrosion inhibitor. The second corrosion inhibitor comprises an organic compound including a ring structure. The second carrier body is formed of a second degradable material.

In still another embodiment, a coating for inhibiting corrosion on a metal surface includes a coating base and a corrosion inhibiting composition. The coating base includes an organic layer. The corrosion inhibiting composition is dispersed in the coating base. The corrosion inhibiting composition includes a first plurality of carriers and a second plurality of carriers. Each of the first plurality of carriers includes a first carrier body and a first corrosion inhibitor. The first carrier body encapsulates the first corrosion inhibitor. The first corrosion inhibitor comprises a first organic compound including a ring structure. The first carrier body is formed of a first degradable material. Each of the second plurality of carriers includes a second carrier body and second corrosion inhibitor. The second carrier body encapsulates the second corrosion inhibitor. The second corrosion inhibitor comprises a second organic compound including a ring structure. The second corrosion inhibitor is different from the first corrosion inhibitor. The second carrier body is formed of a second degradable material.

In yet still another embodiment, a method for inhibiting corrosion on a metal substrate includes applying a coating to a metal substrate. The coating includes a coating base and a corrosion inhibiting composition. The coating base includes an organic layer. The corrosion inhibiting composition is dispersed in the coating base. The corrosion inhibiting composition includes a first plurality of carriers and second plurality of carriers. Each of the first plurality of carriers includes a first carrier body and a first corrosion inhibitor. The first carrier body encapsulates the first corrosion inhibitor. The first corrosion inhibitor comprises a first organic compound including a ring structure. The first carrier body is formed of a first degradable material. Each of the second plurality of carriers includes a second carrier body and a second corrosion inhibitor. The second carrier body encapsulates the second corrosion inhibitor. The second corrosion inhibitor comprises a second organic compound including a ring structure. The second corrosion inhibitor is different from the first corrosion inhibitor. The second carrier body is formed of a second degradable material.

In another embodiment, a method for inhibiting corrosion on a metal substrate includes applying a coating to a metal substrate. The coating includes a coating base and a corrosion inhibiting composition. The coating base includes an organic layer. The corrosion inhibiting composition is dispersed in the coating base. The corrosion inhibiting composition includes a plurality of carriers. Each of the plurality of carriers comprises a carrier body and a corrosion inhibitor. The carrier body encapsulates the corrosion inhibitor. The corrosion inhibitor comprises an organic compound including a ring structure. The carrier body is formed of a degradable material.

In still another embodiment, a method for inhibiting corrosion on a metal substrate includes applying a coating to a metal substrate. The coating includes a coating base and a corrosion inhibiting composition. The coating base includes an organic layer. The corrosion inhibiting composition is dispersed in the coating base. The corrosion inhibiting composition includes a first plurality of carriers and a second plurality of carriers. Each of the first plurality of carriers includes a first carrier body and a first corrosion inhibitor. The first carrier body encapsulates the first corrosion inhibitor. The first corrosion inhibitor comprises an organic phosphonate. The first carrier body is formed of a first degradable material. Each of the second plurality of carriers includes a second carrier body and second corrosion inhibitor. The second carrier body encapsulates the second corrosion inhibitor. The second corrosion inhibitor comprises an organic compound including a ring structure. The second carrier body is formed of a second degradable material.

DETAILED DESCRIPTION

In the following detailed description, reference is made to the accompanying drawings that form a part hereof, and in which is shown, by way of illustration, specific embodiments in which the invention may be practiced. These embodiments are described in sufficient detail to enable those skilled in the art to practice the invention. Other embodiments may be utilized and structural, logical, and chemical changes may be made without departing from the scope of the present invention. The following detailed description is, therefore, not to be taken in a limiting sense, and the scope of the present invention is defined only by the appended claims and equivalents thereof.

Figure 1:
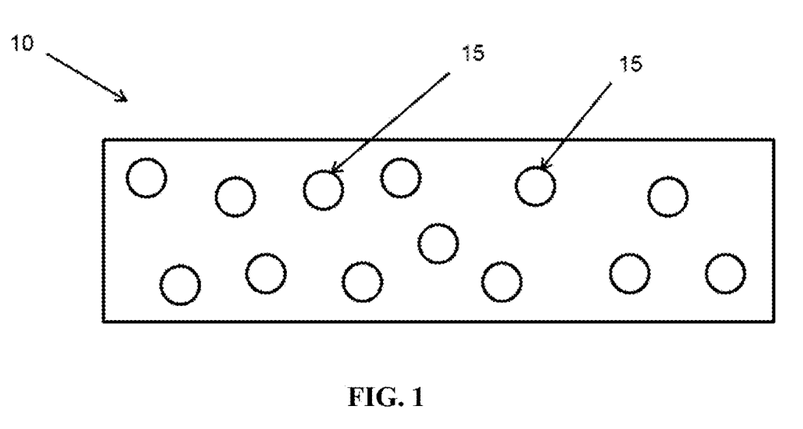
FIG. 1 illustrates an embodiment of a corrosion inhibiting composition having a plurality of carriers.
Figure 4:
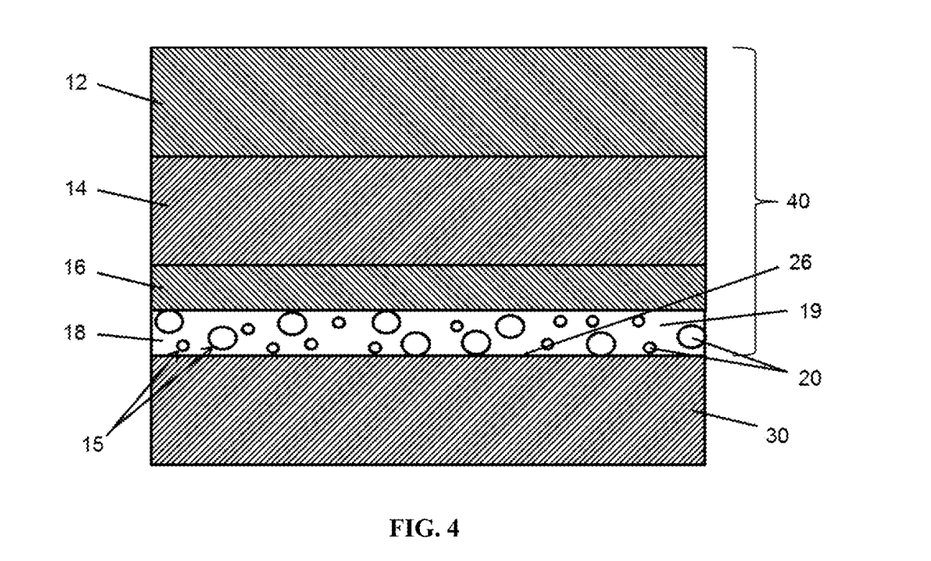
FIG. 4 illustrates an embodiment of a coating system applied to a surface of a metal body portion of a vehicle.

FIG. 1 generally illustrates a corrosion inhibiting composition 10. The corrosion inhibiting composition 10 can be applied to a metal surface (as indicated in FIG. 4), such as a vehicle body. As shown in FIG. 1, the composition 10 can include a plurality of carriers 15.

In general, each carrier 15 can be a microparticle that can be included in a protective coating. Such protective coating can then be applied to a metal substrate and cured thereon, so that any mechanical damage or corrosive damage to the resultant coating can cause the carrier to rupture or otherwise fail so that a repair or protective substance is released and deployed into or onto the damaged area of the coating, for example, to the exposed surface of a metal substrate. In a non-limiting example, the carrier 15 can have a substantially spherical configuration. It will be appreciated that such carriers 15 can form spherical particles, including but not limited to, microspheres, microcapsules, microparticles, nanospheres, nanocapsules and nanoparticles. However, the carrier is not limited to spherical particles, as one of ordinary skill in the art will appreciate that a variety of different shapes may be used for the carrier. Illustrative examples include, rods, fibers, tubes or elongated capsules.

Figure 2A:
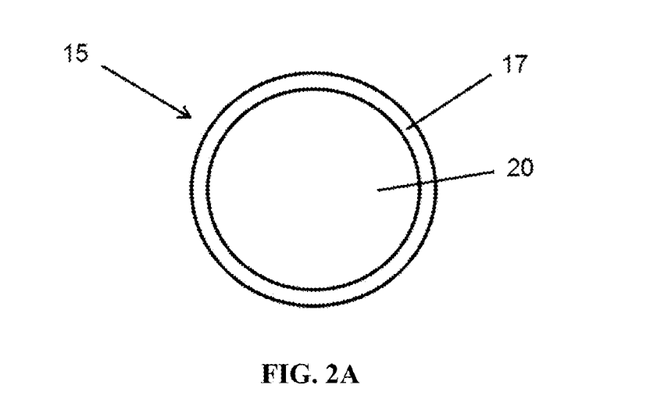
FIG. 2A illustrates one embodiment of a carrier having a carrier body and a corrosion inhibitor.
Figure 2B:
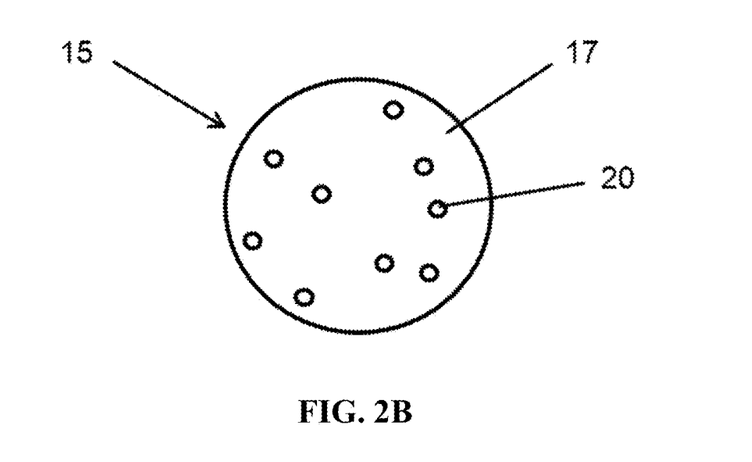
FIG. 2B illustrates another embodiment of a carrier having a carrier body and a corrosion inhibitor.
Figure 2C:
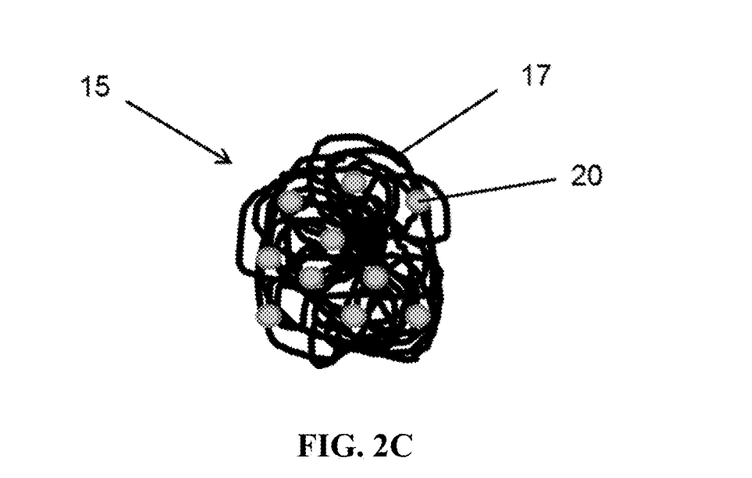
FIG. 2C illustrates another embodiment of a carrier having a carrier body and a corrosion inhibitor.

FIGS. 2A, 2B, and 2C are enlarged, non-limiting, views of carrier 15. As shown in FIGS. 2A, 2B, and 2C, carrier 15 can include a carrier body 17 and at least one organic corrosion inhibitor 20. As shown in FIG. 2A, the carrier 15 is in the form of a microcapsule such that the carrier body 17 encircles and encapsulates the least one organic corrosion inhibitor 20 therein. The organic corrosion inhibitor 20 can be a liquid, solid, or a gas entrapped in aerogel or various combinations thereof. For certain embodiments, an organic corrosion inhibitor is dissolved or dispersed in a hydrophobic substance, such as oil, or a hydrophilic substance, such as water, optionally with one or more active substances such as a film-forming compound. For certain embodiments, the carrier 15 can contain only active substances such as the organic corrosion inhibitor 20.

In certain embodiments, the carrier body 17 of the carrier 15 can comprise gelatin, polyurethane, urea formaldehyde, melamine formaldehyde, melamine formaldehyde/pentaerythritol tetrakis or a suitable combination thereof. In certain embodiments, the carrier body 17 can be formed having a multi-walled shell.

Each carrier can have a substantially spherical shape with an average outer diameter up to 50 µm. In certain embodiments, each carrier has an average outer diameter ranging from about 100 nm to 15 µm. In certain embodiments, each carrier has an average outer diameter ranging from about 0.5 µm to 10 µm. In certain embodiments, each carrier has an average outer diameter of about 5 µm or less. In certain embodiments, each carrier has an average outer diameter ranging from about 1 µm to 2 µm. The average outer diameter of each carrier can be measured using a variety of suitable techniques, including for example, optical microscopy and laser diffraction.

Each carrier 15 can having a carrier body 17 formed from a degradable material. For example, the mechanical integrity of the carrier body 17 can break down, disintegrate or otherwise deteriorate in the presence of a base (or an alkaline), e.g., having a pH of about 8 or above, such that the carrier body 17 is breached and the organic corrosion inhibitor 20 is released from the carrier 15. In certain embodiments, the carrier body 17 can be breached due to mechanical damage to the carrier body 17 (e.g., rupture, fracture, scratching, etc.). It will be appreciated that carrier body 17 for each carrier 15 can be formed from different degradable materials. It will also be appreciated that once the carrier body 17 degrades; the organic corrosion inhibitor 20 can be released to the environment adjacent to the carrier 15.

Carriers 15 having carrier bodies 17 that break down under basic, or alkaline, conditions or rupture due to mechanical damage are generally known in the art. It is the interaction of alkaline conditions with functional groups of the cross-linking agent that causes carrier body 17 to break down or disintegrate under alkaline conditions. Alternatively, the organic corrosion inhibitor 20 can be released mechanically, such as by scratching or applying pressure to the carrier body 17 of the carriers 15 in the corrosion inhibiting composition 10 or to a coating to which the corrosion inhibiting composition 10 is applied.

A basic, or alkaline, condition often forms in the presence of corrosion in a metal or a metal alloy, e.g., a basic condition often forms next to corrosion-induced pits, crevices, etc. For example, when a drop of salt water is applied to steel, an anodic reaction can occur to produce a rust spot, and a cathodic reaction (the reduction reaction of the oxygen in the presence of water), can occur to produce a basic condition. Therefore, when a coating, containing the corrosion inhibiting composition 10, is applied to a metal substrate, and if corrosion occurs, carrier bodies 17 of the plurality of carriers 15 can be exposed to the basic condition (e.g., alkaline) and will break down or disintegrate under the basic condition resulting from the corrosion, thereby releasing organic corrosion inhibitors 20. Corrosion can include any chemical or electrochemical process involving the deterioration or degradation of metals, including pitting, crevice corrosion, dissimilar metal corrosion, or the like.

An acidic condition often forms in the presence of corrosion in a metal or a metal alloy, e.g., an acidic condition often forms at corrosion-induced pits, crevices, etc. For example, when a drop of salt water is applied to steel, an anodic reaction can occur to produce an acidic condition, and a cathodic reaction (the reduction reaction of the oxygen in the presence of water), can occur to produce a basic condition. Therefore, when a coating, containing the corrosion inhibiting composition 10, is applied to a metal substrate, and if corrosion occurs, carrier bodies 17 of the plurality of carriers 15 can be exposed to the acidic condition and will break down or disintegrate under the acidic condition resulting from the corrosion, thereby releasing organic corrosion inhibitors 20. Corrosion can include any chemical or electrochemical process involving the deterioration or degradation of metals, including pitting, crevice corrosion, dissimilar metal corrosion, or the like. In a non-limiting example, both a mixture of alkaline and acidic degradable polymer carriers 15 can be used. It is to be understood that the same corrosion inhibitor can be used in both types of carriers or different corrosion inhibitors can be used in an acidic degradable carrier and alkaline degradable carrier.

Microcapsules as described above can be formed using a variety of suitable methods. For example, a microcapsule can be formed by forming an oil (e.g., toluene, vegetable oil) in water emulsion. A surfactant, such as xanthan gum, Attagel 40 (available from Engelhard Corporation, Iselin, N.J., USA), Petro BAF (available from Akzo Nobel Chemicals, Inc., Chicago, Ill., USA), and/or Reax 83 (available from MeadWestvaco Corporation, Stamford, Conn., USA) can be added to the emulsion to evenly distribute the oil in the water. A pre-polymer (e.g., an amino resin pre-polymer), a cross-linking agent having one or more ester or thioester groups that are broken down under alkaline conditions, and the organic corrosion inhibitor 20 can then be added to the oil phase. A catalyst (e.g., an inorganic acid) can be added to the water phase. The oil in water emulsion can then be heated, causing a polymerization reaction to occur at the water-oil interface, thus allowing for the formation of the carrier body 17 around organic corrosion inhibitor 20 to form the carrier 15.

In a non-limiting example shown in FIG. 2B, the carrier 15 can be a microparticle including the organic corrosion inhibitor 20, and optionally one or more other active ingredients. As shown in FIG. 2B, the carrier body 17 of the carrier 15 can be a solid binder that contains (e.g., encapsulates) the organic corrosion inhibitor 20. The organic corrosion inhibitor 20 can be a liquid, solid, or a gas entrapped in aerogel or various combinations thereof. For certain embodiments, the organic corrosion inhibitor 20 can be dissolved or dispersed in a hydrophobic substance, such as oil, or a hydrophilic substance, such as water, and optionally one or more active substances such as corrosion indicator, inorganic corrosion inhibitor, film-forming compound, or various combinations thereof. For certain embodiments, the carrier 15 contains only active substances such as the organic corrosion inhibitor 20, and optionally corrosion indicators, film-forming compounds, or various combinations thereof.

The solid binder forming the carrier body 17 of the microparticle carrier 15 as shown in FIG. 2B, can comprise gelatin, polyurethane, urea formaldehyde, melamine formaldehyde, melamine formaldehyde/pentaerythritol tetrakis or a suitable combination thereof.

The microparticle carrier 15 shown in FIG. 2B can include a carrier body 17 comprising a solid binder formed from a degradable material. For example, the mechanical integrity of the solid binder can break down, disintegrate or otherwise deteriorate in the presence of a base (or an alkaline), e.g., having a pH of about 8 or above, such that the solid binder is breached and the organic corrosion inhibitor 20 is released from the carrier 15. In certain embodiments, a solid binder can be breached due to mechanical damage to the solid binder (e.g., rupture, fracture, scratching, etc.). It will be appreciated that the solid binder for each carrier body 17 of each carrier 15 can be formed from different degradable materials. It will also be appreciated that once a solid binder degrades the organic corrosion inhibitor 20 can be subsequently released to the environment adjacent to the carrier 15.

Microparticle type carriers 15 having carrier body 17 formed of a solid binder that breaks down under basic, or alkaline, conditions or rupture due to mechanical damage are known in the art. Such microparticles can be formed using a variety of suitable methods. A basic, or alkaline, condition often forms in the presence of corrosion in a metal or a metal alloy, e.g., a basic condition often forms next to corrosion-induced pits, crevices, etc. For example, when a drop of salt water is applied to steel, an anodic reaction can occur to produce a rust spot, and a cathodic reaction (the reduction reaction of the oxygen in the presence of water), can occur to produce a basic condition. Therefore, when a coating, including the corrosion inhibiting composition 10, is applied to a metal substrate, and if corrosion occurs, the solid binders forming the carrier bodies 17 of the microparticle carriers 15 can be exposed to the basic condition (e.g., alkaline) and will break down or disintegrate under the basic condition resulting from the corrosion, thereby releasing the organic corrosion inhibitor 20. Corrosion can include any chemical or electrochemical process involving the deterioration or degradation of metals, including pitting, crevice corrosion, dissimilar metal corrosion, or the like.

In a non-limiting example shown in FIG. 2C, the carrier 15 can be a polymer particle (e.g., a polymer microparticle and a polymer nanoparticle) including the organic corrosion inhibitor 20, and optionally one or more other active ingredients. As shown in FIG. 2C, the carrier body 17 of the carrier 15 can be at least one polymer chain that contains (e.g., encapsulates) the organic corrosion inhibitor 20. In one embodiment, the carrier body 17 can be formed of a high pH responsive polymer (HPRP). The HPRP can have a number average molecular weight of about 2,500 to about 5,000. The organic corrosion inhibitor 20 can be a liquid, solid, or a gas entrapped in aerogel or various combinations thereof. For certain embodiments, the organic corrosion inhibitor 20 can be dissolved or dispersed in a hydrophobic substance, such as oil, or a hydrophilic substance, such as water, and optionally one or more active substances such as corrosion indicator, inorganic corrosion inhibitor, film-forming compound, or various combinations thereof. For certain embodiments, the carrier 15 contains only active substances such as the organic corrosion inhibitor 20, and optionally corrosion indicators, film-forming compounds, or various combinations thereof.

The polymer particle carrier 15 shown in FIG. 2C can include a carrier body 17 comprising at least one polymer chain (e.g., HPRP with carboxylic acid end groups and a hydrophilic segment) formed from a degradable material. For example, the mechanical integrity of the polymer chain(s) can break down, disintegrate or otherwise deteriorate in the presence of a base (or an alkaline), e.g., having a pH of about 8 or above, such that the solid binder is breached and the organic corrosion inhibitor 20 is released from the carrier 15. It will be appreciated that the polymer chain(s) for each carrier body 17 of each carrier 15 can be formed from different degradable materials. It will also be appreciated that once a polymer chain degrades (e.g., breaks apart) the organic corrosion inhibitor 20 can be subsequently released to the environment adjacent to the carrier 15.

Polymer particle type carriers 15 having carrier body 17 formed of a polymer chain that breaks down under basic, or alkaline, conditions or rupture due to mechanical damage are known in the art. Such polymer particles can be formed using a variety of suitable methods, including, for example, a phase inversion method. For example, the organic corrosion inhibitor 20 can be dispersed between the entangled polymer chains that form the carrier body 17. A basic, or alkaline, condition often forms in the presence of corrosion in a metal or a metal alloy, e.g., a basic condition often forms next to corrosion-induced pits, crevices, etc. For example, when a drop of salt water is applied to steel, an anodic reaction can occur to produce a rust spot, and a cathodic reaction (the reduction reaction of the oxygen in the presence of water), can occur to produce a basic condition. Therefore, when a coating, including the corrosion inhibiting composition 10, is applied to a metal substrate, and if corrosion occurs, the polymer chains forming the carrier bodies 17 of the carriers 15 can be exposed to the basic condition (e.g., alkaline) and will break down or disintegrate under the basic condition resulting from the corrosion, thereby releasing the organic corrosion inhibitor 20. Corrosion can include any chemical or electrochemical process involving the deterioration or degradation of metals, including pitting, crevice corrosion, dissimilar metal corrosion, or the like.

In certain embodiments, an organic corrosion inhibitor can comprise from about 10% to about 50%, by weight, of a carrier; in certain embodiments, from about 15% to about 40% by weight, of a carrier; and in certain embodiments from about 20% to about 35%, by weight, of a carrier.

Once the carrier body 17 of the carrier 15, including any of those illustrated in FIG. 2A, 2B or 2C, has degraded, a repair substance and/or an anti-corrosion substance can be released.

Without being limited to any particular theory, the organic corrosion inhibitor 20 can use one or more mechanisms to provide the requisite corrosion protection, including for example, absorption and adsorption. Organic corrosion inhibitors can include, but are not limited to, organo phosphonates (including, but not limited to phenyl phosphonic acid), amine compounds (including, but not limited to triethanolamine and dodecylamine), imidazole compounds (including, but not limited to benzoimidazole, and 2-phenilimidazoline), oxazole compounds, indazole compounds, triazole compounds (including, but not limited to benzotriazole), pyrazole compounds (including, but not limited to 3-Methyl-5-pyrazolone), thiazole compounds (including, but not limited to 2-Mercaptobenzothiazole), quinoline and quinolone compounds (including, but not limited to 8-Hydroxyquinoline, and 8-Hydroxyquinaldine), their derivatives, and combinations thereof.

In certain embodiments, a corrosion inhibiting composition can include a plurality of carriers, each having a carrier body and a corrosion inhibitor encapsulated by the carrier body. The corrosion inhibitor can include an organic compound including a ring structure. The carrier body can be formed of a degradable material. In a non-limiting example, the corrosion inhibitor can be a chelating agent or capable of acting as a chelating agent. For example, the corrosion inhibitor may have a plurality of donor atoms. In a non-limiting example, the corrosion inhibitor can include an organic compound such as a heterocyclic compound with an endocyclic donor atom and an exocyclic donor atom. For example, the corrosion inhibitor may include a heterocyclic compound with an exocyclic donor atom directly bonded to the heterocyclic compound (e.g., 2-Mercaptobenzothiazole and 3-Methyl-5-pyrazolone), or an exocyclic donor atom that is not directly bonded to the heterocyclic ring (e.g., 8-Hydroxyquinoline and 8-Hydroxyquinaldine). In a non-limiting example, the carrier body can comprise gelatin, polyurethane, urea formaldehyde, melamine formaldehyde/pentaerythritol tetrakis or a suitable combination thereof. In certain embodiments, the plurality of carriers can form microparticles.

Figure 3:
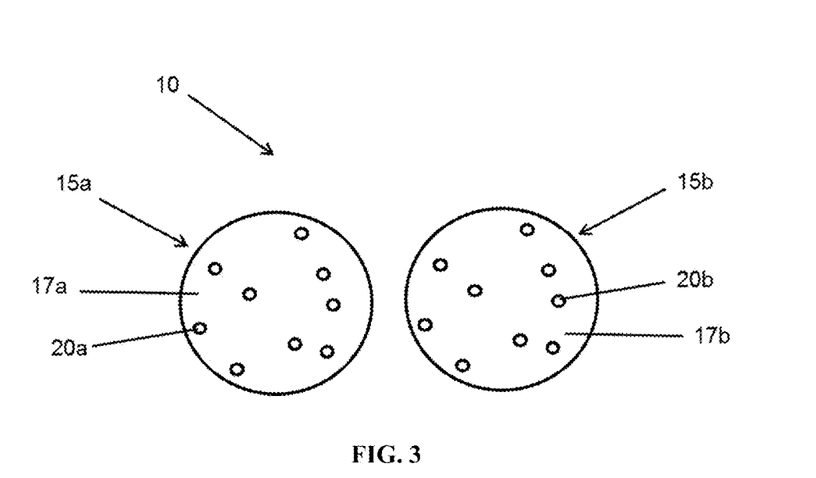
FIG. 3 illustrates one embodiment of a plurality of carriers having different corrosion inhibitors.

In an embodiment shown in FIG. 3, the corrosion inhibiting composition 10 can include a first carrier 15a including a first corrosion inhibitor 20a, and a second carrier 15b including a second corrosion inhibitor 20b that is different from the first corrosion inhibitor 20a. In certain embodiments, the corrosion inhibiting composition 10 will comprise a first plurality of carriers 15a and a second plurality of carriers 15b.

The first carrier 15a can include the first corrosion inhibitor 20a that is an organo phosphonate, and the second carrier 15b can include the second corrosion inhibitor 20b that is an organic compound including a ring structure. In a non-limiting example, the organo phosphonate can be a phosphonic acid derivative (e.g., phenyl phosphonic acid). In a non-limiting example, the second corrosion inhibitor can be a chelating agent or be capable of acting as a chelating agent. For example, the second corrosion inhibitor may have a plurality of donor atoms. In a non-limiting example, the second corrosion inhibitor 20b can include a heterocyclic compound with an endocyclic donor atom and an exocyclic donor atom. For example, the second corrosion inhibitor 20b may include a heterocyclic compound with an exocyclic donor atom directly bonded to the heterocyclic ring (e.g., 2-Mercaptobenzothiazole and 3-Methyl-5-pyrazolone), or an exocyclic donor atom that is not directly bonded to the heterocyclic ring (e.g., 8-Hydroxyquinoline and 8-Hydroxyquinaldine).

In one non-limiting example, the first corrosion inhibitor can be phenyl phosphonic acid, and the second corrosion inhibitor can be 2-Mercaptobenzothiazole. In another non-limiting example, the first corrosion inhibitor can be phenyl phosphonic acid, and the second corrosion inhibitor can be 8-Hydroxyquinoline.

In certain embodiments, the corrosion inhibiting composition 10 of FIG. 3 can include a first carrier 15a including a first organic corrosion inhibitor 20a, and a second carrier 15b including a second organic corrosion inhibitor 20b that is different from the first organic corrosion inhibitor 20a. The first carrier 15a and the second carrier 15b may be formed as microparticles that are degradable in a corrosive environment. For example, a first carrier body 17a and a second carrier body 17b of the respective first carrier 15a and the second carrier 15b can be formed of degradable materials. It will be appreciated that the first carrier body 17a and the second carrier body 17b can be formed of the same or different materials. In a non-limiting example, the first corrosion inhibitor 20a and the second corrosion inhibitor 20b can be chelating agents or capable of acting as chelating agents. In a non-limiting example, the first corrosion inhibitor 20a can be an organic compound including a ring structure, and the second corrosion inhibitor 20b can be an organic compound including a ring structure. For example, the first corrosion inhibitor 20a and the second corrosion inhibitor can 20b each have a plurality of donor atoms. In a non-limiting example, one or both of the corrosion inhibitors 20a, 20b can include(s) a heterocyclic compound with an endocyclic donor atom and an exocyclic donor atom. In a non-limiting example, the first corrosion inhibitor 20a can include a heterocyclic compound with an exocyclic donor atom directly bonded to the heterocyclic compound (including, but not limited to 2-Mercaptobenzothiazole and 3-Methyl-5-pyrazolone), and the second corrosion inhibitor can include an exocyclic donor atom that is not directly bonded to the heterocyclic compound (including, but not limited to 8-Hydroxyquinoline and 8-Hydroxyquinaldine).

In a non-limiting example, a first organic corrosion inhibitor can be 8-hydroxyquinoline (structure shown below) or a derivative thereof, 8-hydroxyquinaldine or a derivative thereof, or any combination thereof. 8-hydroxyquinoline is a bidentate binding unit containing both an oxygen donor atom (exocyclic donor), and a nitrogen donor atom (endocyclic donor). 8-hydroxyquinoline is capable of acting as a chelating agent and may have the structure shown below when bound to a metal atom, M.

The second organic corrosion inhibitor can be 2-mercaptobenzothiazole (structure shown below as (a)) or a derivative thereof, 2-mercaptobenzimidazole (structure shown below as (b)) or a derivative thereof, 2-(benzothiazol-2-ylsulfanyl)-succinic acid or a derivative thereof, or a combination thereof. 2-mercaptobenzothiazole is a bidentate binding unit containing both a sulfur donor atom (exocyclic donor), and a nitrogen donor atom (endocyclic donor).

A variety of methods are known for forming the carrier 15, such as microcapsules and microparticles.

In certain embodiments, hydrophilic-core microcapsules, such as water-core microcapsules, can be formed from emulsions having hydrophilic-phase droplets dispersed in a hydrophobic substance. One example is water-in-oil emulsions. Water-in-oil emulsions include hydrophilic-phase droplets (e.g., as the dispersed phase) dispersed in the hydrophobic phase (e.g., as the continuous phase). If a compound (active substance) is hydrophilic, or it can be dissolved or dispersed in a hydrophilic solvent (e.g. water), then it can be possible to encapsulate it in hydrophilic-core microcapsules. When a compound does not have sufficient solubility in the hydrophilic solvent, a co-solvent can be used to improve the dissolution of the compound and to facilitate the encapsulation process. Similarly, when a compound cannot be dispersed into the hydrophilic phase to form a reasonably stable suspension (e.g., indicated by droplets of the compound being dispersed throughout the hydrophilic phase and the compound remaining dispersed during emulsion formation and encapsulation processes), a surfactant can be used to improve the dispersion of the compound and facilitate the encapsulation process. So if a compound can be dissolved or dispersed in a hydrophilic solvent, with or without the aid of a co-solvent or a surfactant, it is possible to encapsulate it into hydrophilic-core microcapsules.

Hydrophilic-core microcapsules are typically used for encapsulating water-soluble materials, but not oil-soluble materials, such as non-polar molecules. Oil-soluble materials can be incorporated into hydrophilic-core microcapsules by first adding them to a co-solvent, and then adding the resulting solution to the hydrophilic phase. Alternatively, a surfactant can be added to the hydrophilic phase. This will dissolve or disperse the non-polar or oil-soluble reagents into the hydrophilic phase. The emulsion (e.g. water-in-oil emulsion) can then be formed by adding the hydrophilic phase to a hydrophobic phase and a reaction can be initiated to encapsulate the oil, with the active substance dissolved or dispersed therein, into the core of the hydrophilic-core microcapsules.

In general, oil-core as well as water-core microcapsules can formed to include an organic corrosion inhibitor 20 within the core, being encapsulated by a carrier body 17, such as by a polymeric shell (e.g., see FIG. 2A). Alternatively, the organic corrosion inhibitor 20 in an oil-core microcapsule can be dissolved or dispersed in a hydrophobic substance, such as oil, with or without the aid of a co-solvent or a surfactant. The organic corrosion inhibitor 20, of a water-core microcapsule, can be dissolved or dispersed in water, with or without the aid of a co-solvent or the aid of a surfactant. Other active ingredients including, but not limited to, a dye, a corrosion indicator, an inorganic corrosion inhibitor, a film-forming compound, or various combinations thereof may be included within the carrier body 17.

The polymeric shell or solid binder of either oil-core or water-core microcapsules or microparticles can include a polymer formed from an encapsulant-forming compound (e.g., precursor) that can include a cross-linking agent having one or more ester and mercapto groups and/or a film-forming pre-polymer. In certain embodiments, an encapsulant-forming compound can include about 5 to about 75 percent (e.g., about 20 to about 50 percent) by weight of a cross-linking agent and about 25 to about 95 percent (e.g., about 50 to about 80 percent) by weight of a film-forming pre-polymer. Examples of the cross-linking agent include, but are not limited to, pentaerythritol tetrakis(2-mercaptoacetate) or compounds with similar structure (e.g., pentaerythritol tetrakis(3-mercaptopropionate) (PTT), pentaerythritol, dipentaerythritol, dipentaerythritol pentaacrylate tetra(mercaptoacetate), pentaerythritol tetra(acrylate), and their derivatives. As described herein, examples of the film-forming pre-polymer can include, but are not limited to, urea formaldehyde pre-polymer resin (e.g., butylated urea-formaldehyde resin, such as CYMEL® U80), melamine formaldehyde resin, polyurethane pre-polymers, polyols, or film-forming monomers, such as urea and formaldehyde solution, melamine and formaldehyde solution, isocyanates and various glycols, etc. The encapsulant-forming compound can form the shells of the oil-core as well as the water-core microcapsules, or the solid binders of microparticles as described herein.

The microcapsule shell of either oil-core or water-core microcapsules can include one or more chemical bonds due to the ester group in the cross-linking agent that are cleavable (e.g., broken down) at ambient temperature when the surrounding pH changes due to the occurrence of a corrosion process. For example, the ester groups can undergo an irreversible hydrolysis reaction under basic pH, e.g., when exposed to an alkali.

Cross-linking agents that have three or four functional groups, such as pentaerythritol tetrakis(2-mercaptoacetate), penta erythritol tetrakis(3-mercaptopropionate) (PTT), pentaerythritol, dipentaerythritol, dipentaerythritol pentaacrylate tetra(mercaptoacetate), and pentaerythritol tetraacrylate can also provide chemical resistance (e.g. solvent resistance) to the microcapsule shells.

It will be appreciated that a number of suitable techniques are available to form the microcapsules and microparticles as described herein, including those methods further described in U.S. Pat. Nos. 7,569,625, 7,790,225 and U.S. Patent Application Publication Nos. 2010/0320421, 2010/0305234, 2012/0207921 and 2013/0017612.

In certain embodiments, corrosion inhibitors once released from respective carriers (e.g., microparticles/microcapsules) can adhere or attach to an exposed surface of a metal substrate (e.g., steel door of an automobile) to provide an anti-corrosion barrier. In certain embodiments, such organic corrosion inhibitors can be absorbed or adsorbed into the surface of the metal substrate providing effective corrosion resistance. In certain embodiments, corrosion inhibiting compositions described herein can also be added to a coating base to form a protective coating which can be applied to these metal substrates.

As shown in FIG. 4, surface 26 of a metal substrate 30 is shown overlaid with multiple layers of coatings 12, 14, 16 and 18 (e.g., paints), collectively indicated as 40, with layer 18, immediately adjacent to the surface 26 of a metal substrate 30, incorporating carriers 15 comprising an corrosion inhibitor 20. Metal substrate 30 can, for example, be an outer door panel of a vehicle (e.g., automobile). For coating systems, self-healing or protective coatings can be fabricated by adding carriers containing at least one "self-healing" compound (including, for example, corrosion inhibitors) to commercially available paint primers. Paint primers can include cathodic electrodeposition coatings. Such carriers can release the self-healing compound or compounds when the coating system is damaged. Such damage can occur when the coating is mechanically damaged or suffers corrosive damage.

Coatings, like paint, can include a mixture of solids and a suitable binder, possibly also incorporating a solvent, which can generally be applied to a surface as a thin liquid layer and forms a closely adherent coating on the surface when the liquid layer is "cured". Paint formulations vary widely. For example, a solvent can be an organic liquid, or water or can be eliminated entirely by applying the paint solids in powder form, relying on electrostatic attraction to build a thin layer. Many automotive paints employ water as a solvent and are referred to as "water-based". Irrespective of the solvent however, in one example, automotive paints can be cured by exposure to heat in a paint bake oven.

Automotive coatings 40 can include a single layer or comprise multiple layers (e.g., four layers represented as layers 12, 14, 16 and 18 in FIG. 4). In general, layer 18 immediately adjacent to surface 26 of a metal substrate 30 can be generally intended to provide corrosion protection once the automotive coatings 40 have suffered damage. One method of applying layer 18 can be via electrodeposition (or e-coating), but it will be appreciated by one skilled in the art, that a variety of other suitable coating techniques to apply layer 18 can be employed (e.g., spraying, brushing, rolling, etc.). Subsequent layers can include: a primer-surfacer, such as represented by 16, to smooth out surface irregularities, improve stone-chip performance, and help protect against visible and UV light; a basecoat, such as represented by 14, to provide color and aesthetic effects; and a clearcoat, such as represented by 12, to provide primary protection against environmental effects and imparts gloss and depth to the overall paint finish. These three coatings can be applied as liquid sprays. All three coatings can be applied without intermediate high temperature exposure or cure, a procedure commonly described as 'wet on wet', and cured in a single paint bake oven. However, layer 18 can be cured separately in a separate paint bake oven prior to applying the remaining layers. Thus, typical automobile painting practice will expose painted parts to the elevated temperatures required for paint baking at least twice. However, it will be appreciated that there are a variety of suitable methods and techniques of applying coatings (e.g., paint layers) to surfaces of a metal body part of a vehicle.

The coating of layer 18 can include a coating base 19 and one or more additives such as a plurality of carriers 15 (e.g., microcapsules and microparticles). The coating base 19 can be a solvent, such as an aliphatic hydrocarbon (e.g., aliphatic petroleum distillates). Other such coating bases 19 (e.g., paint primers) can include greases, lubricants, varnishes, lacquers, shellacs, waxes, polishes, polyurethanes, oil-based enamels, enamel undercoater, latex acrylics, acrylic-based formulations, epoxy-based formulations (e.g., epoxy isocyanate resins), and other suitable combinations thereof. Other suitable coating bases are described in U.S. Pat. Nos. 5,070,174, 7,612,152 and 7,723,405. Carriers 15 can be dispersed into a coating base 19 using a variety of suitable techniques (e.g., by mixing, chemical dispersion agents, etc.). Suitable methods of dispersing microcapsules into a coating base are described in U.S. Patent Application Publication No. 2011/0064941. A coating can comprise about 0.1% by weight or more of carriers. In certain embodiments, a coating can comprise about 0.5% by weight or more of carriers; in certain embodiments, about 1.0% by weight or more of carriers; in certain embodiments, about 2.5% by weight or more of carriers; in certain embodiments, about 5.0% by weight or more of carriers; in certain embodiments, about 7.5% by weight or more of carriers; and in certain embodiments, about 10% by weight or more of carriers. It will be understood that a coating can include materials or substances in addition to the coating base and carriers. For example, a coating can include one or more agents that facilitate improvements in the properties of the coating, or a coating can include a filler to increase the volume or mechanical integrity of the coating.

In certain embodiments, a coating base can include a copolymer that includes an epoxy-group, such as an epoxy resin. Epoxy-groups can have a molecular weight of about 100 or more; in certain embodiments, of about 500 or more; in certain embodiments, of about 750 or more; in certain embodiments, of about 1,000 or more; in certain embodiments, of about 1,250 or more; in certain embodiments, of about 1,500 or more; and in certain embodiments of about 2,000 or more. Epoxy-groups can have a molecular weight of about 100,000 or less; in certain embodiments, of about 50,000 or less; in certain embodiments, of about 20,000 or less; in certain embodiments, of about 15,000 or less; in certain embodiments, of about 10,000 or less; in certain embodiments, of about 7,500 or less; in certain embodiments, of about 5,000 or less; and in certain embodiments of about 4,000 or less. It will be appreciated that a number of techniques are known to calculate the molecular weight of suitable epoxy-groups and copolymers.

A coating base can include the dry portion of a coating which does not include the carriers. A coating can comprise about 75% by weight or more of a coating base. In certain embodiments, a coating can comprise about 80% by weight or more of a coating base; in certain embodiments, about 85% by weight or more of a coating base; in certain embodiments, about 90% by weight or more of a coating base; in certain embodiments, about 95% by weight or more of a coating base; in certain embodiments, about 97.5% by weight or more of a coating base; in certain embodiments, about 99% by weight or more of a coating base; in certain embodiments, about 99.5% by weight or more of a coating base; and in certain embodiments, about 99.9% by weight or more of a coating base.

A coating can have a thickness of about 5 µm or more; in certain embodiments, of about 10 µm or more; in certain embodiments, of about 15 µm or more; in certain embodiments, of about 25 µm or more; in certain embodiments, of about 50 µm or more; in certain embodiments, of about 100 µm or more; in certain embodiments, of about 150 µm or more; in certain embodiments of about 200 µm or more; and in certain embodiments of about 300 µm or more. In certain embodiments, a coating can have a thickness of about 10 µm to about 100 µm. In certain embodiments, a coating can have a thickness of about 55 µm to about 25 µm.

Repair substances, such as film-forming compounds can fill voids in the original coating to seal and protect the damaged area. These film-forming compounds can be released from carriers (e.g., microcapsules or microparticles) once the encapsulant (e.g., carrier body) becomes damaged. Such suitable film-forming compounds can include a clear varnish (e.g., an acrylic varnish), epoxy resins, polar aprotic solvents, siloxane resins (e.g., polydimethylsiloxane), linseed oil, tung oil, silyl ester, isocyanates, or combinations thereof. Other suitable film-forming compounds can include polybutenes, phenolics, phenolic varnishes, long chain polyester diluents, carrier diluents, and combinations thereof. Other suitable film-forming compounds are further described in U.S. Patent Application Publication Nos. 2006/0042504, 2008/0152815, 2012/0000810 and 2012/0052307.

To assist in locating corrosive damage to a coating, corrosion indicators can also be included as an encapsulate in a carrier. Suitable corrosion indicators can include a pH indicator that changes color over the alkaline region (e.g., pHs above about 8), such as phenolphthalein. Other suitable corrosion indicators can include ones that fluoresce, such as 7-hydroxycoumarin or coumarin, in the presence of or upon the oxidation of a metal or in the presence or upon the formation of a metal cation complex.

In certain embodiments, where a coating is applied, carriers can include one or more film-forming compounds, corrosion inhibitors, corrosion indicators, or various combinations thereof. For certain embodiments, if a coating is exposed to trauma that carriers to break or rupture, a film-forming compound in the carrier can be released to cover at least a portion of the surface area suffering the trauma and then acts to reduce the degree of any exposed metal of corroding. For certain embodiments, a corrosion inhibitor in a carrier can also be released to act to further reduce the degree of corrosion of any exposed metal.

Note that if corrosion occurs at locations away from the trauma location due to small breaks in the coating, such as chips, or other coating defects, corrosion inhibitors and film-forming compounds can be released due to encapsulants breaking down in the presence of the basic condition, resulting from the corrosion.

In certain embodiments, a portion of carriers in a coating can contain corrosion inhibitors and another portion of carriers in the coating can contain film-forming compounds. In certain embodiments, a portion of carriers in a coating can contain corrosion inhibitors, another portion of carriers in the coating can contain film-forming compounds, and yet another portion of carriers in the coating can contain corrosion indicators. For certain embodiments, carriers having different contents are randomly distributed within a coating base so that carriers having the different functions of indicating, inhibiting, and/or film-forming can be adjacent each other, as well as carriers having like functions being adjacent to each other. For certain embodiments, the different functions of encapsulates can be incorporated into a coating by encapsulating different encapsulates into the same carriers.

PROCEDURES

A. Hot Salt Water Test

The hot salt water test can measure the amount of corrosion suffered by a metal substrate by measuring the amount of creep that occurs at the tested area.

To measure the amount of creep suffered by a test piece (e.g., metal substrate), an X-cut must first be made to the test piece, such that the X-cut reaches the base material of the test piece. A cutting knife shall be used to make the X-cut. The X-cut shall have a cross angle from 60° to 90°. The cutting knife shall be SK2 and have a hardness of HV 820+/−30. Verify the X-cut by applying electric current Immerse the test piece in 5 wt % NaCl solution at 55° C. in a glass container, and seal the container tightly. After 240 hours, remove the test piece from the container, then immediately rinse and wipe it lightly with a soft cloth. Check test piece for any rust, blisters or peeling. If rust or blister is found, measure the blister width. Then immediately attach a piece of adhesive tape to the flaw area, and peel it off in the manner specified in Adhesion Test (see below). The adhesive tape shall be cellophane and be 12 or 24 mm in width (e.g., Nichiban Cellotape). If peeling is found, measure the maximum peeling width, and that should be the peeling width. Record either the blister width or the peeling width, whichever is larger, as the blister width/peeling width, otherwise known as the creep value (measured in mm).

In certain embodiments, a coating exhibits a creep value according to the Hot Salt Water Test of about 0.8 mm or less; in certain embodiments, about 0.6 mm or less; in certain embodiments, about 0.4 mm or less; in certain embodiments, about 0.2 mm or less; and in certain embodiments, that is negligible (essentially zero).

B. Adhesion Test

Attach a 12 or 24 mm wide piece of cellophane adhesive tape (e.g., Nichiban Cellotape) to the coating film surface of a test piece carefully not to leave any bubble between them. Hold one edge of the adhesive tape so that the angle between the adhesive face of the tape and the test piece is approximately 45° as shown in the Figure below, and peel the tape off the test piece rapidly in the same direction.

C. Salt Spray Test

The salt spray test can measure the amount of corrosion suffered by a metal substrate by measuring the amount of creep that occurs at the tested area.

To measure the amount of creep suffered by a test piece (e.g., metal substrate), an X-cut must first be made to the test piece, such that the X-cut reaches the base material of the test piece. A cutting knife shall be used to make the X-cut. The X-cut shall have a cross angle from 60° to 90°. The cutting knife shall be SK2 and have a hardness of HV 820+/−30. Verify the X-cut by applying electric current. Affix the test piece on a salt spray tester at 15° to 30° to the vertical line, and subject it to spraying of 5.0 wt % NaCl solution for 960 hours. The salt spray tester shall conform to ASTM B117 standard. The salt spray tester shall have the test conditions as shown in the table below.

| | |
|---|---|
| Tester operation method | Continuous |
| Test chamber | 35 ± 1° C. |
| Air saturator temperature | 47 ± 1° C. |
| Relative humidity of test chamber | 95 to |
| Spraying pressure | 70 to 180 kPa (0.7 to 1.8 Kgf/cm$^2$) |
| Amount of solution collected from | 0.85 to 2.0 mL/hour for 80 cm$^2$ |
| pH of solution made by sparying | 6.5 to 7.2 |

After the subjecting the test piece to the salt spray tester, rinse the test piece and clear the corrosion product using a sponge or scrubbing cloth. Measure the width of the largest swollen area of the X-cut. After leaving the test piece at room temperature for two hours, check the film peeling property by attaching a 12 or 24 mm wide adhesive tape (e.g., Nichiban Cellotape) and peeling it off as specified in Adhesion Test described above. Measure the width of the largest area of the coating film peeled with the tape. Record the width of either the blistered area or peeled area, whichever is larger, as the creep value (measured in mm).

In certain embodiments, a coating exhibits a creep value according to the Salt Spray Test of about 1.6 mm or less; in certain embodiments, about 1.3 mm or less; in certain embodiments, about 1.1 mm or less; in certain embodiments, about 1.0 mm or less; and in certain embodiments, about 0.8 mm or less.

EXAMPLES

For the examples provided below, an epoxy-based coating (e.g., film layer) having a plurality of carriers (some with corrosion inhibitors and some without) was applied (baked at 170° C. for 20 minutes) to a steel sample formed from zinc phosphated steel. The coatings were applied using a draw down bar method to a thickness of 25 microns. The epoxy-based coating included a coating base formed from a BPA epoxy resin, isocyanate and methyl isobutyl ketone (MIBK). The carriers were formed as microparticles. For each example, the plurality of carriers had a carrier body formed of melamine formaldehyde/pentaerythritol tetrakis. The amount of carrier in each coating was provided as a % wt. of the coating and was measured on a dry basis. A creep value was measured and recorded three times using the Hot Salt Water Test and the Salt Spray Test for the comparative and inventive examples, and the average of those three trials was provided below in Table 1 when available.

TABLE 1

| Coatings | Corrosion inhibitor(s) | Amount of carrier in coating (% wt. on a dry basis) | Hot Salt Water Test Creep Value (mm) | Salt Spray Test Creep Value (mm) |
|---|---|---|---|---|
| Comparative Example A | None | 10 | 1.4 | 2.3 |
| Comparative Example B | None | 5 | 0.8 | — |
| Comparative Example C | None | 0 | 0.8 | 1.7 |
| Inventive Example D | 8-Hydroxyquinoline | 10 | 0.3 | 1.5 |
| Inventive Example E | 8-Hydroxyquinoline | 5 | 0.2 | 1.1 |
| Inventive Example F | 8-Hydroxyquinoline** | 10 | negligible | 1.5 |
| Inventive Example G | 8-Hydroxyquinoline** | 5 | negligible | 0.9 |
| Inventive Example H | 8-Hydroxyquinoline/phenyl phosphonic acid | 5/5* | negligible | 1.2 |
| Inventive Example I | 8-Hydroxyquinoline/2-Mercaptobenzothiazole | 5/5* | negligible | 1.2 |
| Inventive Example J | 8-Hydroxyquinoline**/phenyl phosphonic acid | 5/5* | negligible | 1.6 |
| Inventive Example K | 8-Hydroxyquinoline**/2-Mercaptobenzothiazole | 5/5* | negligible | 1.3 |
| Inventive Example L | 2-Mercaptobenzothiazole | 5 | 0.5 | 1.1 |
| Inventive Example M | 2-Mercaptobenzothiazole*** | 5 | 0.8 | 0.9 |
| Inventive Example N | phenyl phosphonic acid/2-Mercaptobenzothiazole | 2.5/2.5* | 0.7 | — |
| Inventive Example O | phenyl phosphonic acid/2-Mercaptobenzothiazole | 3.25/1.75* | 0.4 | — |

TABLE 1-continued

| Coatings | Corrosion inhibitor(s) | Amount of carrier in coating (% wt. on a dry basis) | Hot Salt Water Test Creep Value (mm) | Salt Spray Test Creep Value (mm) |
| --- | --- | --- | --- | --- |
| Inventive Example P | phenyl phosphonic acid/2-Mercaptobenzothiazole | 4.0/1.0* | negligible | — |
| Inventive Example Q | phenyl phosphonic acid/2-Mercaptobenzothiazole*** | 2.5/2.5* | 0.3 | — |
| Inventive Example R | phenyl phosphonic acid/2-Mercaptobenzothiazole*** | 3.25/1.75* | 0.3 | — |
| Inventive Example S | phenyl phosphonic acid/2-Mercaptobenzothiazole*** | 4.0/1.0* | negligible | — |
| Inventive Example T | 8-Hydroxyquinoline** | 2.5 | negligible | 1.1 |
| Inventive Example U | 2-Mercaptobenzothiazole | 2.5 | 0.2 | 0.9 |
| Inventive Example V | 8-Hydroxyquinoline** | 1.0 | negligible | 1.1 |
| Inventive Example W | 2-Mercaptobenzothiazole | 1.0 | 0.4 | 1.1 |
| Inventive Example X | 2-Mercaptobenzothiazole*** | 1.0 | 0.2 | 0.8 |
| Inventive Example Y | 8-Hydroxyquinoline** | 0.5 | negligible | 1.1 |
| Inventive Example Z | 2-Mercaptobenzothiazole | 0.5 | 0.3 | 1.1 |
| Inventive Example AA | 2-Mercaptobenzothiazole*** | 0.5 | 0.2 | 1.2 |
| Inventive Example BB | 8-Hydroxyquinoline** | 0.1 | negligible | 1.1 |
| Inventive Example CC | 2-Mercaptobenzothiazole | 0.1 | 0.4 | 1.3 |
| Inventive Example DD | 2-Mercaptobenzothiazole*** | 0.1 | 0.3 | 1.5 |
| Inventive Example EE | 8-Hydroxyquinoline/2-Mercaptobenzothiazole*** | 2.5/2.5* | 0.1 | — |
| Inventive Example FF | 8-Hydroxyquinoline/2-Mercaptobenzothiazole*** | 3.25/1.75* | negligible | — |
| Inventive Example GG | 8-Hydroxyquinoline/2-Mercaptobenzothiazole*** | 4.0/1.0* | negligible | — |

*Indicates that when more than one corrosion inhibitor is present, the % wt. is provided for each corrosion inhibitor and total % wt. can be calculated by adding the values together.
**Represents that a double concentration of 8-Hydroxyquinoline was used in these particular comparative examples.
***Represents that 2-Mercaptobenzothiazole used in these particular comparative examples was prepared using a different encapsulation process.

As illustrated in Table 1, Comparative Examples A, B and C (those coatings with no corrosion inhibitors) exhibit creep values according to the Hot Salt Water Test described herein of 0.8 mm or greater. Each of Inventive Examples D-GG exhibits a creep value according to the Hot Salt Water Test described herein of 0.8 mm or less. In fact, Inventive Examples F, G, H, I, J, K P, S, T, V, Y, BB, FF and GG each exhibit a negligible (essentially zero) creep value according to the Hot Salt Water Test described herein.

Also shown in Table 1, Comparative Example A and C exhibits a creep value of 2.3 mm and 1.7 mm, respectively, according to the Salt Spray Test described herein. For those Inventive Examples for which a creep value was measured, the creep value exhibited by the coatings was 1.6 mm or less according to the Salt Spray Test described herein.

Inventive Examples D-GG provide alternatives to traditional coatings to protect metal substrates, and offer substantial improvements in preventing or inhibiting corrosion.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All documents cited in the Detailed Description are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A coating for inhibiting corrosion on a metal substrate, the coating comprising a corrosion inhibiting composition comprising:
a first plurality of carriers, each comprising a first carrier body and a first corrosion inhibitor, the first carrier body encapsulating the first corrosion inhibitor, wherein the first corrosion inhibitor is a first organic compound comprising a ring structure and wherein the first carrier body is formed of a first degradable material; and
a second plurality of carriers, each comprising a second carrier body and a second corrosion inhibitor, the second carrier body encapsulating the second corrosion inhibitor, wherein the second carrier body is formed of a second degradable material;
wherein the second corrosion inhibitor is a second organic compound comprising a ring structure, wherein the second corrosion inhibitor is different from the first corrosion inhibitor, wherein the second plurality of carriers does not include the first corrosion inhibitor and the first plurality of carriers does not include the second corrosion inhibitor, and wherein the first degradable material has a mechanical integrity which deteriorates in at least one of an alkaline condition and an acidic condition sufficient to release the first corrosion inhibitor from the first degradable material;
wherein the coating exhibits a creep value of about 0.6 mm or less according to a hot salt water test when the coating is tested at a thickness of 25 microns,
wherein the hot salt water test comprises:
cutting an X-shaped cut into a test piece of a metal substrate comprising a base material using an SK2 cutting knife having a hardness of HV 820+/−30, wherein the X-shaped cut has a cross angle from 60° to 90° and reaches the base material of the metal substrate,
immersing the test piece in a 5 wt % NaCl solution at 55° C. in a container,
sealing the container,
removing the test piece from the container after 240 hours and rinsing and wiping the test piece,
measuring a width of any rust and/or blister on the test piece in order to determine a blister width, and
attaching a 12 or 24 mm wide piece of cellophane adhesive tape to the rust and/or blister, holding the edge of the adhesive tape to form an angle of 45° between the adhesive tape and test piece, peeling off the adhesive tape, and measuring a width of any resulting peeled portion in order to determine a peeling width, wherein the creep value is the larger of the peeling width and the blister width.

2. The coating of claim 1, wherein the first organic compound comprises a heterocyclic compound.

3. The coating of claim 1, wherein the first corrosion inhibitor is a chelating agent.

4. The coating of claim 2, wherein the heterocyclic compound includes an endocyclic donor atom and an exocyclic donor atom.

5. The coating of claim 4, wherein the exocyclic donor atom is directly bonded to a heterocyclic ring of the heterocyclic compound.

6. The coating of claim 4, wherein the exocyclic donor atom is not directly bonded to a heterocyclic ring of the heterocyclic compound.

7. The coating of claim 2, wherein the heterocyclic compound is selected from the group consisting of 2-mercaptobenzothiazole, 2-mercaptobenzimidazole, 2-(benzothiazol-2-ylsulfanyl)-succinic acid, 8-hydroxyquinoline, 8-hydroxyquinaldine, and any combination thereof.

8. The coating of claim 1, wherein the first corrosion inhibitor and the second corrosion inhibitor comprises from about 10% to about 40%, by weight, of the first plurality of carriers and the second plurality of carriers.

9. The coating of claim 8, wherein the first corrosion inhibitor and the second corrosion inhibitor comprises from about 15% to about 35%, by weight, of the first plurality of carriers and the second plurality of carriers.

10. A coating for inhibiting corrosion on a metal substrate, the coating comprising a corrosion inhibiting composition; comprising:
a first plurality of carriers, each comprising a first carrier body and a first corrosion inhibitor, the first carrier body encapsulating the first corrosion inhibitor, wherein the first corrosion inhibitor is a first organic compound comprising a ring structure and wherein the first carrier body is formed of a first degradable material; and
a second plurality of carriers, each comprising a second carrier body and a second corrosion inhibitor, the second carrier body encapsulating the second corrosion inhibitor, wherein the second carrier body is formed of a second degradable material;
wherein the second corrosion inhibitor is a second organic compound comprising a ring structure, wherein the second corrosion inhibitor is different from the first corrosion inhibitor, wherein the second plurality of carriers does not include the first corrosion inhibitor and the first plurality of carriers does not include the second corrosion inhibitor, and wherein the first degradable material has a mechanical integrity which deteriorates in at least one of an alkaline condition and an acidic condition sufficient to release the first corrosion inhibitor from the first degradable material;
wherein the coating exhibits a creep value of about 1.6 mm or less according to a salt spray test when the coating is tested at a thickness of 25 microns,
wherein the salt spray test comprises:
cutting an X-shaped cut into a test piece of a metal substrate comprising a base material using an SK2 cutting knife having a hardness of HV 820+/−30, wherein the X-shaped cut has a cross angle from 60° to 90° and reaches the base material of the metal substrate,
affixing the test piece on a salt spray tester conforming to ASTM B117 standard, with a test chamber temperature of 35±1° C., an air saturator temperature of 47±1° C., a test chamber relative humidity of about 95%, a spraying pressure of from 70 to 180 kPa, an amount of solution collected being from 0.85 to 2.0 mL/hour for 80 cm2, and a pH of solution made by spraying of from 6.5 to 7.2, at 15° to 30° to a vertical line,
subjecting the test piece to spraying of 5.0 wt % NaCl solution for 960 hours,
rinsing the test piece to remove any corrosion product,
measuring a width of the largest swollen area of the X-shaped cut in order to determine a blister width,
after two hours at room temperature, attaching a 12 or 24 mm wide piece of cellophane adhesive tape to the test piece, holding the edge of the adhesive tape to form an angle of 45° between the adhesive tape and test piece, and peeling the tape off the test piece, measuring a width of an area of the coating which was peeled with the tape to determine a peeling width, wherein the creep value is the larger of the peeling width and the blister width.

11. The coating of claim 10, wherein the first organic compound comprises a heterocyclic compound.

12. The coating of claim 10, wherein the first corrosion inhibitor is a chelating agent.

13. The coating of claim 11, wherein the heterocyclic compound includes an endocyclic donor atom and an exocyclic donor atom.

14. The coating of claim 13, wherein the exocyclic donor atom is directly bonded to a heterocyclic ring of the heterocyclic compound.

15. The coating of claim 13, wherein the exocyclic donor atom is not directly bonded to a heterocyclic ring of the heterocyclic compound.

16. The coating of claim 11, wherein the heterocyclic compound is selected from the group consisting of 2-mercaptobenzothiazole, 2-mercaptobenzimidazole, 2-(benzothiazol-2-ylsulfanyl)-succinic acid, 8-hydroxyquinoline, 8-hydroxyquinaldine, and any combination thereof.

17. The coating of claim 10, wherein the first corrosion inhibitor and the second corrosion inhibitor comprises from about 10% to about 40%, by weight, of the first plurality of carriers and the second plurality of carriers.

18. The coating of claim 17, wherein the first corrosion inhibitor and the second corrosion inhibitor comprises from about 15% to about 35%, by weight, of the first plurality of carriers and the second plurality of carriers.

19. A coating for inhibiting corrosion on a metal substrate, the coating comprising a corrosion inhibiting composition comprising:

a first plurality carriers, each comprising a first carrier body and a first corrosion inhibitor, the first carrier body encapsulating the first corrosion inhibitor, the first corrosion inhibitor is a first organic compound including a ring structure, wherein the first carrier body is formed of a first degradable material; and a second plurality of carriers, each comprising a second carrier body and a second corrosion inhibitor, the second carrier body encapsulating the second corrosion inhibitor, the second corrosion inhibitor is a second organic compound including a ring structure, wherein the second corrosion inhibitor is different from the first corrosion inhibitor, wherein the first plurality of carriers does not include the second corrosion inhibitor and the second plurality of carriers does not include the first corrosion inhibitor, and wherein the second carrier body is formed of a second degradable material, wherein the coating exhibits a creep value of about 0.6 mm or less according to a hot salt water test when the coating is tested at a thickness of 25 microns, wherein the hot salt water test comprises:

cutting an X-shaped cut into a test piece of a metal substrate comprising a base material using an SK2 cutting knife having a hardness of HV 820+/−30, wherein the X-shaped cut has a cross angle from 60° to 90° and reaches the base material of the metal substrate, immersing the test piece in a 5 wt % NaCl solution at 55° C. in a container, sealing the container, removing the test piece from the container after 240 hours and rinsing and wiping the test piece, measuring a width of any rust and/or blister on the test piece in order to determine a blister width, and attaching a 12 or 24 mm wide piece of cellophane adhesive tape to the rust and/or blister, holding the edge of the adhesive tape to form an angle of 45° between the adhesive tape and test piece, peeling off the adhesive tape, and measuring a width of any resulting peeled portion in order to determine a peeling width, wherein the creep value is the larger of the peeling width and the blister width.

20. The coating of claim 19, wherein the coating exhibits a creep value of about 0.4 mm or less according to the hot salt water test.

21. The coating of claim 20, wherein the coating exhibits a creep value of about 0.2 mm or less according to the hot salt water test.

22. The coating of claim 19, wherein said first carriers and said second carriers each form microparticles.

23. The coating of claim 19, wherein the first corrosion inhibitor is a chelating agent.

24. The coating of claim 19, wherein the second corrosion inhibitor is a chelating agent.

25. The coating of claim 19, wherein the first corrosion inhibitor includes at least one donor atom that is different than donor atoms included in the second corrosion inhibitor.

26. The coating of claim 19, wherein the first organic compound is a first heterocyclic compound.

27. The coating of claim 26, wherein the first heterocyclic compound includes an endocyclic donor atom and an exocyclic donor atom.

28. The coating of claim 27, wherein the exocyclic donor atom is directly bonded to a heterocyclic ring of the first heterocyclic compound.

29. The coating of claim 19, wherein the first organic compound includes a thiazole compound, an imidazole compound, or any combination thereof.

30. The coating of claim 19, wherein the first organic compound includes 2-mercaptobenzothiazole, 2-mercaptobenzimidazole, or any combination thereof.

31. The coating of claim 19, wherein the second organic compound is a second heterocyclic compound.

32. The coating of claim 31, wherein the second heterocyclic compound includes an endocyclic donor atom and an exocyclic donor atom.

33. The coating of claim 32, wherein the exocyclic donor atom is not directly bonded to a heterocyclic ring of the second heterocyclic compound.

34. The coating of claim 19, wherein the second organic compound includes a quinolone, a quinolone derivative, or any combination thereof.

35. The coating of claim 33, wherein the second corrosion inhibitor is 8-hydroxyquinoline, 8-hydroxyquinaldine, or any combination thereof.

36. A coating for inhibiting corrosion on a metal substrate, the coating comprising a corrosion inhibiting composition comprising:

a first plurality carriers, each comprising a first carrier body and a first corrosion inhibitor, the first carrier body encapsulating the first corrosion inhibitor, the first corrosion inhibitor is a first organic compound including a ring structure, wherein the first carrier body is formed of a first degradable material; and a second plurality of carriers, each comprising a second carrier body and a second corrosion inhibitor, the second carrier body encapsulating the second corrosion inhibitor, the second corrosion inhibitor is a second organic compound including a ring structure, wherein the second corrosion inhibitor is different from the first corrosion inhibitor, wherein the first plurality of carriers does not include the second corrosion inhibitor and the second plurality of carriers does not include the first corrosion inhibitor, and wherein the second carrier body is formed of a second degradable material, wherein the coating exhibits a creep value of about 1.6 mm or less according to a salt spray test when the coating is tested at a thickness of 25 microns, wherein the salt spray test comprises:

cutting an X-shaped cut into a test piece of a metal substrate comprising a base material using an SK2 cutting knife having a hardness of HV 820+/−30, wherein the X-shaped cut has a cross angle from 60° to 90° and reaches the base material of the metal substrate, affixing the test piece on a salt spray tester conforming to ASTM B117 standard, with a test chamber temperature of 35±1° C., an air saturator temperature of 47±1° C., a test chamber relative humidity of about 95%, a spraying pressure of from 70 to 180 kPa, an amount of solution collected being from 0.85 to 2.0 mL/hour for 80 cm2, and a pH of solution made by spraying of from 6.5 to 7.2, at 15° to 30° to a vertical line, subjecting the test piece to spraying of 5.0 wt % NaCl solution for 960 hours, rinsing the test piece to remove any corrosion product, measuring a width of the largest swollen area of the X-shaped cut in order to determine a blister width, after two hours at room temperature, attaching a 12 or 24 mm wide piece of cellophane adhesive tape to the test piece, holding the edge of the adhesive tape to form an angle of 45° between the adhesive tape and test piece, and peeling the tape off the test piece, measuring a width of an area of the coating which was peeled with the tape to determine a peeling width, wherein the creep value is the larger of the peeling width and the blister width.

37. The coating of claim 36, wherein the coating exhibits a creep value of about 1.3 mm or less according to the salt spray test.

38. The coating of claim 37, wherein the coating exhibits a creep value of about 1.0 mm or less according to the salt spray test.

39. The coating of claim 36, wherein said first carriers and said second carriers each form microparticles.

40. The coating of claim 36, wherein the first corrosion inhibitor is a chelating agent.

41. The coating of claim 36, wherein the second corrosion inhibitor is a chelating agent.

42. The coating of claim 36, wherein the first corrosion inhibitor includes at least one donor atom that is different than donor atoms included in the second corrosion inhibitor.

43. The coating of claim 36, wherein the first organic compound is a first heterocyclic compound.

44. The coating of claim 43, wherein the first heterocyclic compound includes an endocyclic donor atom and an exocyclic donor atom.

45. The coating of claim 44, wherein the exocyclic donor atom is directly bonded to a heterocyclic ring of the first heterocyclic compound.

46. The coating of claim 36, wherein the first organic compound includes a thiazole compound, an imidazole compound, or any combination thereof.

47. The coating of claim 36, wherein the first organic compound includes 2-mercaptobenzothiazole, 2-mercaptobenzimidazole, or any combination thereof.

48. The coating of claim 36, wherein the second organic compound is a second heterocyclic compound.

49. The coating of claim 48, wherein the second heterocyclic compound includes an endocyclic donor atom and an exocyclic donor atom.

50. The coating of claim 49, wherein the exocyclic donor atom is not directly bonded to a heterocyclic ring of the second heterocyclic compound.

51. The coating of claim 36, wherein the second organic compound includes a quinolone, a quinolone derivative, or any combination thereof.

52. The coating of claim 50, wherein the second corrosion inhibitor is 8-hydroxyquinoline, 8-hydroxyquinaldine, or any combination thereof.

53. A coating for inhibiting corrosion on a metal substrate, the coating comprising:

a coating base comprising an organic layer; and a corrosion inhibiting composition dispersed in the coating base, the corrosion inhibiting composition comprising:

a first plurality carriers, each comprising a first carrier body and a first corrosion inhibitor, the first carrier body encapsulating the first corrosion inhibitor, the first corrosion inhibitor is a first organic compound including a ring structure, wherein the first carrier body is formed of a first degradable material; and a second plurality of carriers, each comprising a second carrier body and a second corrosion inhibitor, the second carrier body encapsulating the second corrosion inhibitor, the second corrosion inhibitor is a second organic compound including a ring structure, wherein the second corrosion inhibitor is different from the first corrosion inhibitor, wherein the first plurality of carriers does not include the second corrosion inhibitor and the second plurality of carriers does not include the first corrosion inhibitor, and wherein the second carrier body is formed of a second degradable material;

wherein the coating exhibits a salt spray creep value of 1.6 mm or less according to a salt spray test when the coating is tested at a thickness of 25 microns and wherein the coating exhibits a hot salt water creep value of 0.6 mm or less according to a hot salt water test when the coating is tested at a thickness of 25 microns, wherein the salt spray test comprises:

cutting an X-shaped cut into a first test piece of a metal substrate comprising a base material using an SK2 cutting knife having a hardness of HV 820+/−30, wherein the X-shaped cut has a cross angle from 60° to 90° and reaches the base material of the metal substrate, affixing the first test piece on a salt spray tester conforming to ASTM B117 standard, with a test chamber temperature of 35±1° C. an air saturator temperature of 47±1° C., a test chamber relative humidity of 95%, a spraying pressure of from 70 to 180 kPa, an amount of solution collected being from 0.85 to 2.0 mL/hour for 80 cm2, and a pH of solution made by spraying of from 6.5 to 7.2, at 15° to 30° to a vertical line, subjecting the first test piece to spraying of 5.0 wt % NaCl solution for 960 hours, rinsing the first test piece to remove any corrosion product, measuring a width of the largest swollen area of the X-shaped cut in order to determine a salt spray blister width, after two hours at room temperature, attaching a 12 or 24 mm wide piece of cellophane adhesive tape to the first test piece, holding the edge of the adhesive tape to form an angle of 45° between the adhesive tape and first test piece, and peeling the tape off the first test piece, measuring a width of an area of the coating which was peeled with the tape to determine a salt spray peeling width, wherein the salt spray creep value is the larger of the salt spray peeling width and the salt spray blister width;

wherein the hot salt water test comprises:

cutting an X-shaped cut into a second test piece of a metal substrate comprising a base material using an SK2 cutting knife having a hardness of HV 820+/−30, wherein the X-shaped cut has a cross angle from 60° to 90° and reaches the base material of the metal substrate, immersing the second test piece in a 5 wt % NaCl solution at 55° C. in a container, sealing the container, removing the second test piece from the container after 240 hours and rinsing and wiping the second test piece, measuring a width of any rust and/or blister on the second test piece in order to determine a hot salt water blister width, and attaching a 12 or 24 mm wide piece of cellophane adhesive tape to the rust and/or blister, holding the edge of the adhesive tape to form an angle of 45° between the adhesive tape and the second test piece, peeling off the adhesive tape, and measuring a width of any resulting peeled portion in order to determine a hot salt water peeling width, wherein the hot salt water creep value is the larger of the hot salt water peeling width and the hot salt water blister width.

* * * * *